(12) United States Patent
Humlicek

(10) Patent No.: US 7,721,143 B2
(45) Date of Patent: May 18, 2010

(54) METHOD FOR REDUCING REBUILD TIME ON A RAID DEVICE

(75) Inventor: Donald R. Humlicek, Wichita, KS (US)

(73) Assignee: LSI Corporation, Milpitas, CA (US)

( * ) Notice: Subject to any disclaimer, the term of this patent is extended or adjusted under 35 U.S.C. 154(b) by 557 days.

(21) Appl. No.: 11/295,344

(22) Filed: Dec. 6, 2005

(65) Prior Publication Data
US 2007/0168706 A1    Jul. 19, 2007

(51) Int. Cl.
*G06F 11/00* (2006.01)
(52) U.S. Cl. .......................................... 714/6; 711/112
(58) Field of Classification Search ...................... 714/6
See application file for complete search history.

(56) References Cited

U.S. PATENT DOCUMENTS

| | | | | |
|---|---|---|---|---|
| 6,412,045 B1 * | 6/2002 | DeKoning et al. | ........... | 711/135 |
| 6,629,198 B2 * | 9/2003 | Howard et al. | ............... | 711/112 |
| 6,799,283 B1 * | 9/2004 | Tamai et al. | .................... | 714/6 |
| 7,139,931 B2 * | 11/2006 | Horn | ............................... | 714/6 |
| 7,590,884 B2 * | 9/2009 | Daikokuya et al. | ............. | 714/8 |
| 2003/0233611 A1 * | 12/2003 | Humlicek et al. | ........... | 714/763 |
| 2005/0166085 A1 * | 7/2005 | Thompson et al. | ............. | 714/6 |
| 2005/0210318 A1 * | 9/2005 | Marks et al. | ................... | 714/7 |
| 2005/0268145 A1 * | 12/2005 | Hufferd et al. | ................. | 714/2 |
| 2006/0117216 A1 * | 6/2006 | Ikeuchi et al. | .................. | 714/6 |
| 2007/0067562 A1 * | 3/2007 | Ohsaki et al. | ............... | 711/113 |

* cited by examiner

*Primary Examiner*—Scott T Baderman
*Assistant Examiner*—Kamini Patel
(74) *Attorney, Agent, or Firm*—Suiter Swantz pc llo

(57) ABSTRACT

The present invention provides a method for reducing rebuild time on a Redundant Array of Independent Disks (RAID) device. A first stripe of the RAID device is selected. Write-back caching on a drive being built is enabled. Data and/or parity may be read from at least one other drive. The at least one other drive and the drive being built belong to a same stripe of the RAID device. When a RAID level of the RAID device is 5, the at least one of data or parity is XORed (exclusive ORed) to obtain a result. When the RAID level of the RAID device is 1, the at least one of data or parity is data and treated as the result. The result is written to a second drive, which is a repaired, replaced, or hot-spare drive for the drive being built.

9 Claims, 14 Drawing Sheets

METHOD FOR REDUCING REBUILD TIME ON A RAID DEVICE

FIELD OF THE INVENTION

The present invention generally relates to the field of computer data storage, particularly to methods for reducing rebuild time on a Redundant Array of Independent Disks (RAID) device.

BACKGROUND OF THE INVENTION

RAID is standardized technology for the storage of data with emphasis on performance, fault tolerance, and the ability to recover data due to a failure of a disk drive. Many RAID products are commercially available. The RAID Advisory Board of St. Peter, Minn. has defined and standardized several different RAID levels. RAID level 1 ("RAID 1"), for example, is a mirrored disk wherein a complete copy of the data on one disk is simultaneously maintained and stored on a second disk. In the event of a failure of one disk, a complete copy of the data on the second disk is available. The data on the second disk may be used to recreate the data on the first disk when the first disk is replaced or repaired. RAID level 5 ("RAID 5") uses several disks to store data. The data is stored in stripes, meaning that for a large block of data, some may be written to the first drive, some to the second drive, and so forth. Several disks may write in parallel, thus increasing the data throughput by a multiple of the number of available disks. RAID 5 uses parity as a method to store redundancy information. Parity is computed by performing the exclusive OR (XOR) function to the data on each block of the stripe. Other RAID levels exist with different variations of performance and cost tradeoffs.

In a RAID device, a logical drive is made up of multiple stripes and a stripe is made up of multiple stripe units wherein each stripe unit is located on a unique physical storage device such as a disk or the like. When a single physical storage device goes defunct and stripe units of data cannot be read from that device, the data may be reconstructed using the stripe units of the remaining physical devices. A stripe is reconstructed by reading all stripe units in a stripe except the failed stripe unit and doing an exclusive OR (XOR) operation on the data. In the case of a disk rebuild operation, this data may be written to a new replacement device designated by the end user. When a logical drive rebuild is performed, each stripe unit is reconstructed until all stripes within that logical drive have been rebuilt.

It is important that a drive group be restored back to full redundancy as soon as possible after a drive failure, because a second drive failure may cause the drive group to become dead with complete loss of data. Conventionally, reduced rebuild time is accomplished by using larger IO (input/output) sizes or by managing multiple concurrent rebuild IOs. However, either of these solutions reduces the amount of memory available for other IO processing, and managing multiple concurrent rebuild IOs tends to be very complex.

Thus, it would be desirable to provide a method for reducing rebuild time on a Redundant Array of Independent Disks (RAID) device.

SUMMARY OF THE INVENTION

In an exemplary aspect, the present invention provides a method for reducing rebuild time on a RAID device by using write-back caching on a drive being rebuilt while also providing full recovery from the loss of the data from a drive's volatile cache in the event that the controller or drive was reset or power-cycled. Two exemplary methods are provided based on whether or not the drive supports a forced media access on an individual write request. On drives where forced media access requests are supported (e.g. SCSI drives), the rebuild process uses checkpoints to record rebuild progress. Non-rebuild disk writes are requested with forced-media-access, rebuild disk writes are requested normally, and cache is flushed before each checkpoint is written. In the event that the rebuild process is interrupted by a controller reset or power cycle or when the drive being rebuilt is reset or power cycled, the rebuild process may resume from the last checkpoint. The process may guarantee that anything written to the disk is committed to media before the checkpoint is made. Any unwritten data that was in the drive's cache at the time of the interruption is rewritten using the RAID storage system's interrupted write recovery mechanism or recreated with the rebuild process and re-written to disk.

On drives where forced media access requests are not supported (e.g. PATA and SATA drives), both non-rebuild disk writes and rebuild disk writes are requested normally. In the event that the rebuild process is interrupted by a controller reset or power cycle or when the drive being rebuilt is reset or power cycled, the rebuild process may start over with the first stripe. This process may guarantee that any unwritten data that was in the drive's cache at the time of the interruption is recreated with the rebuild process and re-written to disk.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
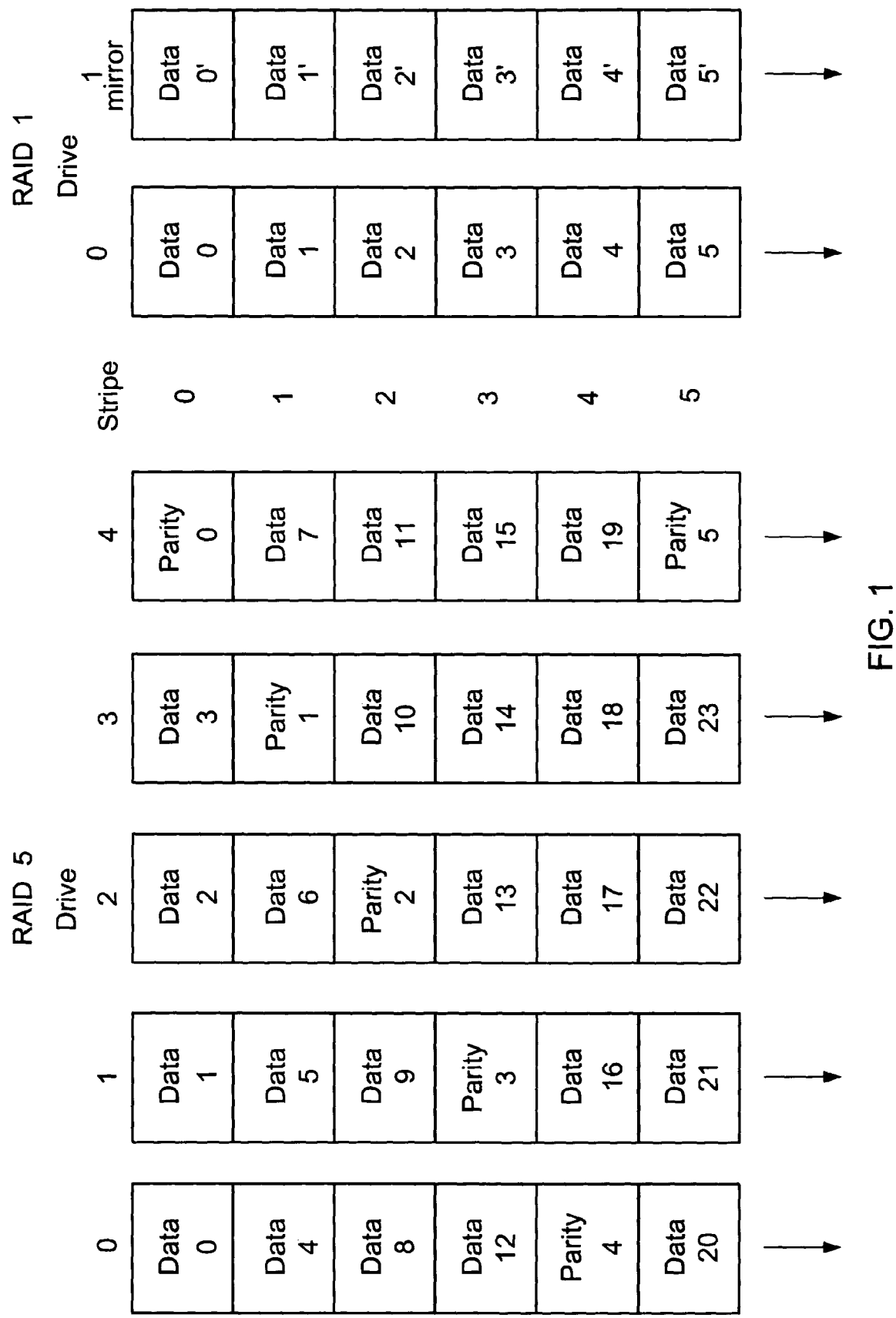
FIG. 1 is a schematic diagram illustrating data and redundancy block layout.

The present invention may apply to RAID storage systems that use a number of disk drives to store data and redundancy information. Redundancy information is used to provide recoverability in the event of an unreadable data block due to a drive failure or media error. The present invention uses RAID 1 and RAID 5 as examples even though it may also apply to other RAID levels without departing from the scope and spirit of the present invention. For RAID 1, redundancy information is a duplicate copy (a mirror) of each block of data. For RAID 5, redundancy information is parity. RAID 5 is a method that stripes data and parity across a group of N drives. Within each stripe are N−1 blocks of data and 1 block of parity. Each block is comprised of one or more disk sectors. The parity is interleaved across all drives. RAID 1 is a method that mirrors each block of data on a second drive, and each block is comprised of one or more disk sectors (other hybrid RAID 1 methods are not discussed here). FIG. 1 shows one method of arranging data and parity blocks for RAID 5 and data and mirror blocks for RAID 1.

Figure 2:
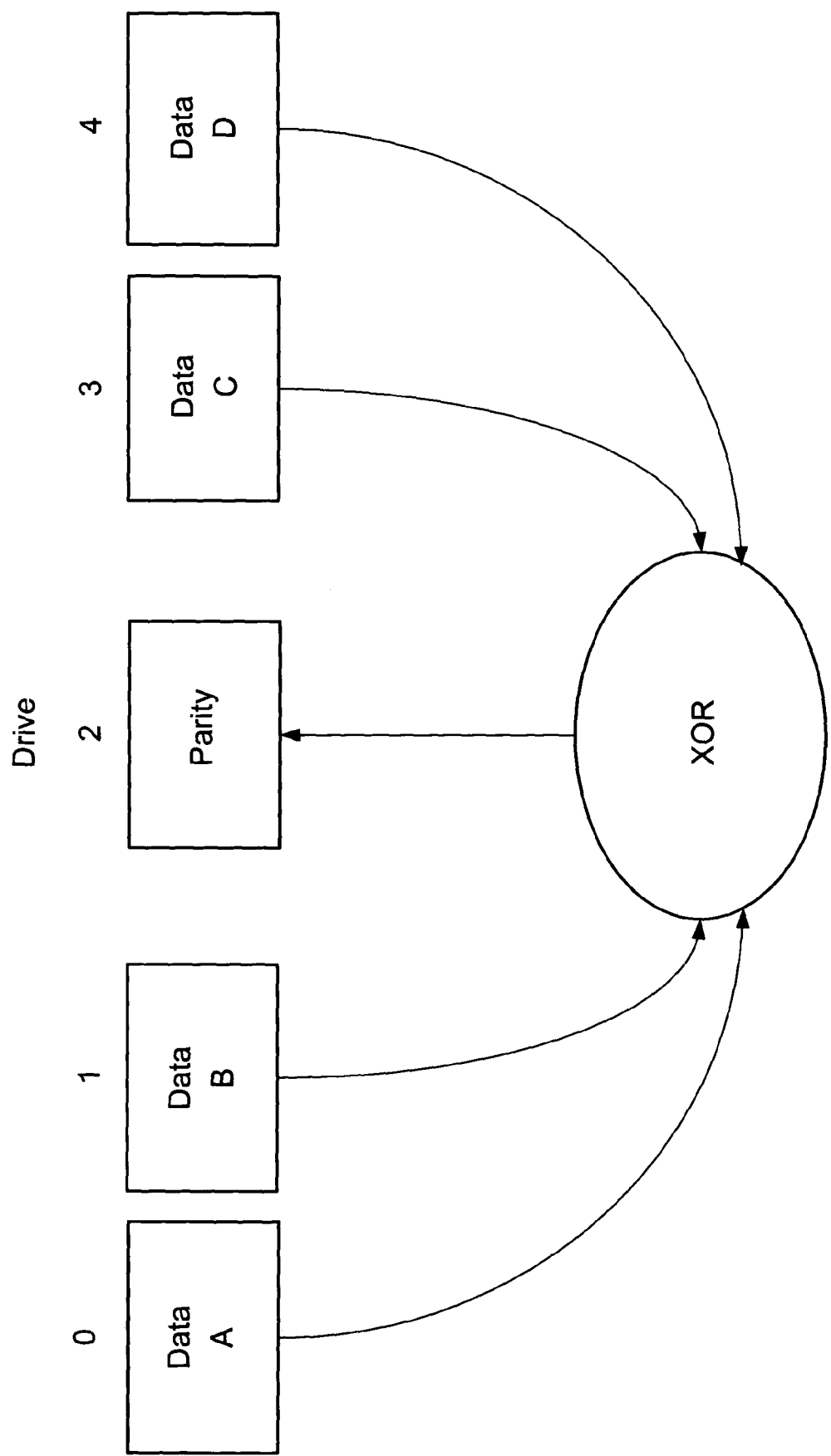
FIG. 2 is a schematic diagram illustrating how RAID 5 parity is created.

RAID 5 parity is computed by exclusive ORing (XORing) each data block within the stripe. FIG. 2 shows how parity is calculated. Thus, in FIG. 1 Parity 0 is the XOR of Data 0, Data 1, Data 2, and Data 3. Parity 1 is the XOR of Data 4, Data 5, Data 6, and Data 7.

Each drive within a drive group has a state. A drive that is still known to be usable is considered in-service, and a drive that is unusable by some predefined set of rules is failed or out-of-service.

Figure 3:
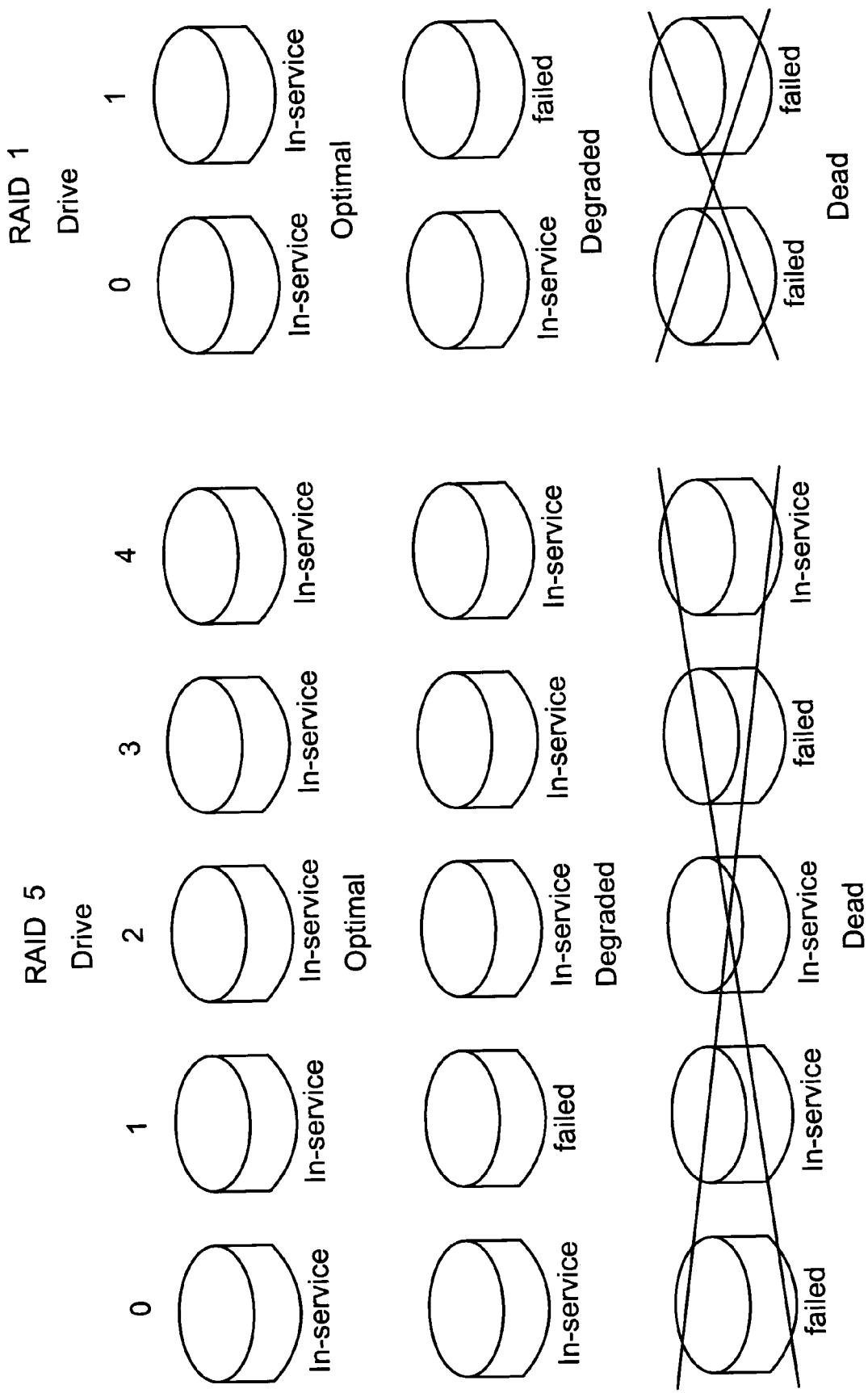
FIG. 3 is a schematic diagram illustrating drive states and drive group states.

A group of drives that does not contain any failed drives is defined to be in an optimal state. A group of drives with one failed drive is defined to be in a degraded state. A group of drives with two or more failed drives is defined to be in a dead state. Reads or writes may be performed on a drive as long as the individual drive is in-service, and the drive group state is optimal or degraded. Reads or writes are not performed to any drive in a group when the drive group state is dead. FIG. 3 shows the various states of a drive group.

Figure 4:
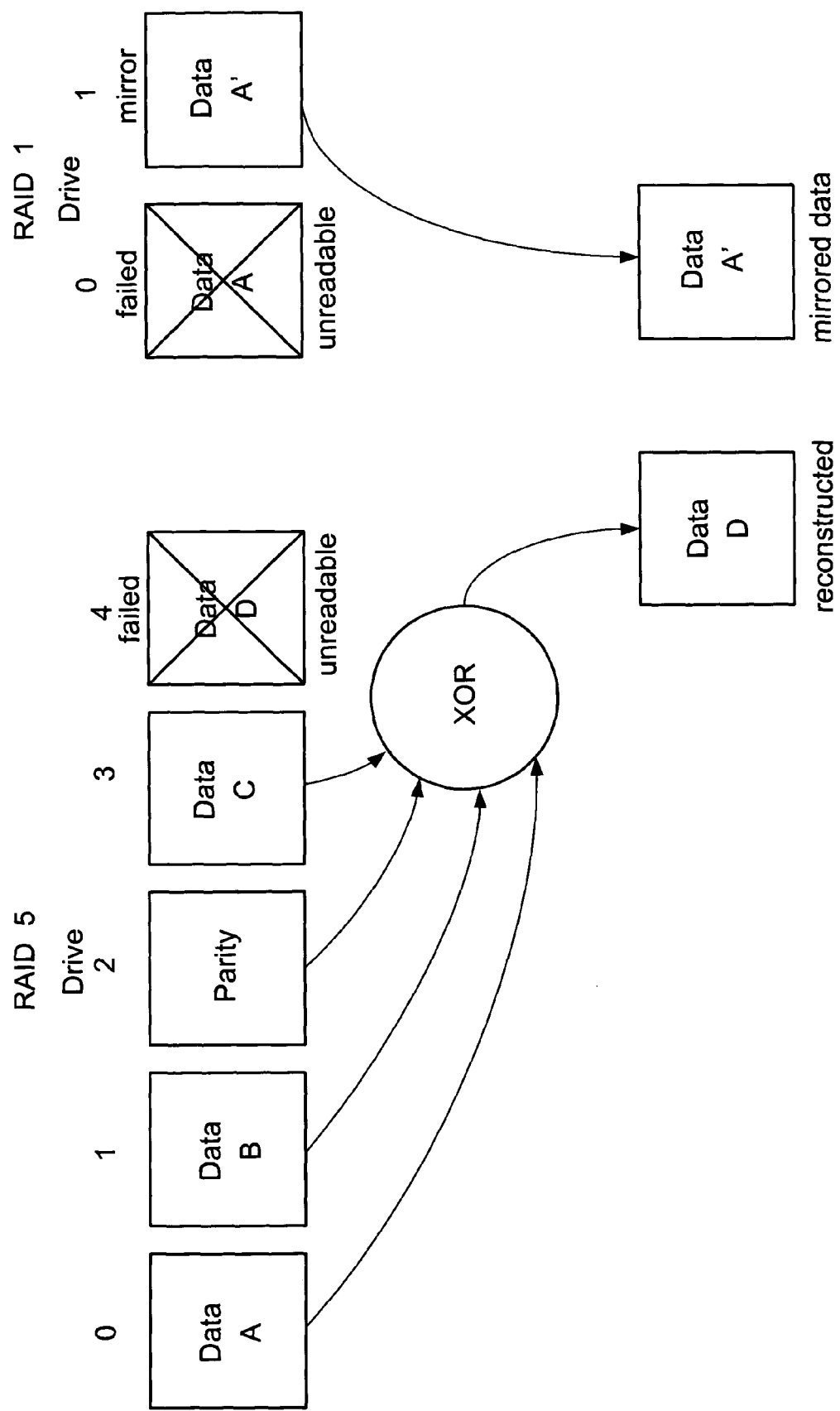
FIG. 4 is a schematic diagram illustrating how data is recovered for a failed drive.

For RAID 5, if any one drive is failed, then the data for the failed drive may be reconstructed by XORing together the other data blocks in the same stripe with its corresponding parity. For RAID 1, if any one drive is failed, then the data may be recovered by reading it from the other drive. FIG. 4 shows how data is recovered for a failed drive. As shown, Data D may be reconstructed by XORing Data A, Data B, Data C, and Parity.

Figure 5:
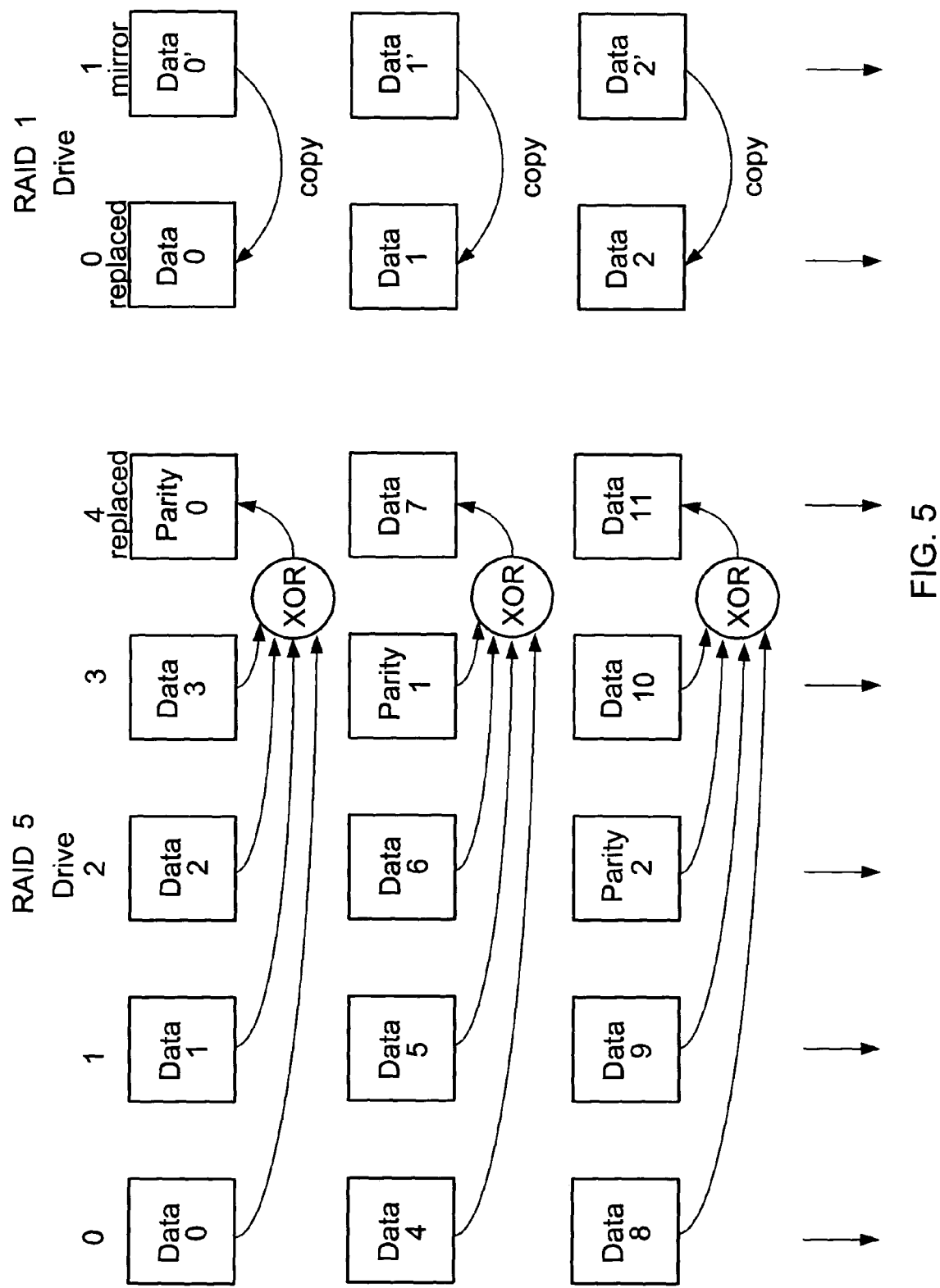
FIG. 5 is a schematic diagram illustrating rebuilding data for a replaced/repaired drive.

It is important that a drive group be restored back to full redundancy as soon as possible after a drive failure, because a second drive failure would cause the drive group to become dead with complete loss of data. In order to bring a degraded drive group back to optimal and restore it to full redundancy, the failed drive must be repaired or replaced, or a stand-by drive, known as a hot spare, must be configured into the group, as a temporary or permanent replacement, and the data (or parity) must be rebuilt. For RAID 5 the data or parity for the repaired/replaced/hot-spare drive is reconstructed by XORing the data and parity from the remaining drives. For RAID 1, the data for the repaired/replaced/hot-spare drive is simply copied from the other drive. FIG. 5 shows how data is rebuilt.

Figure 6A:
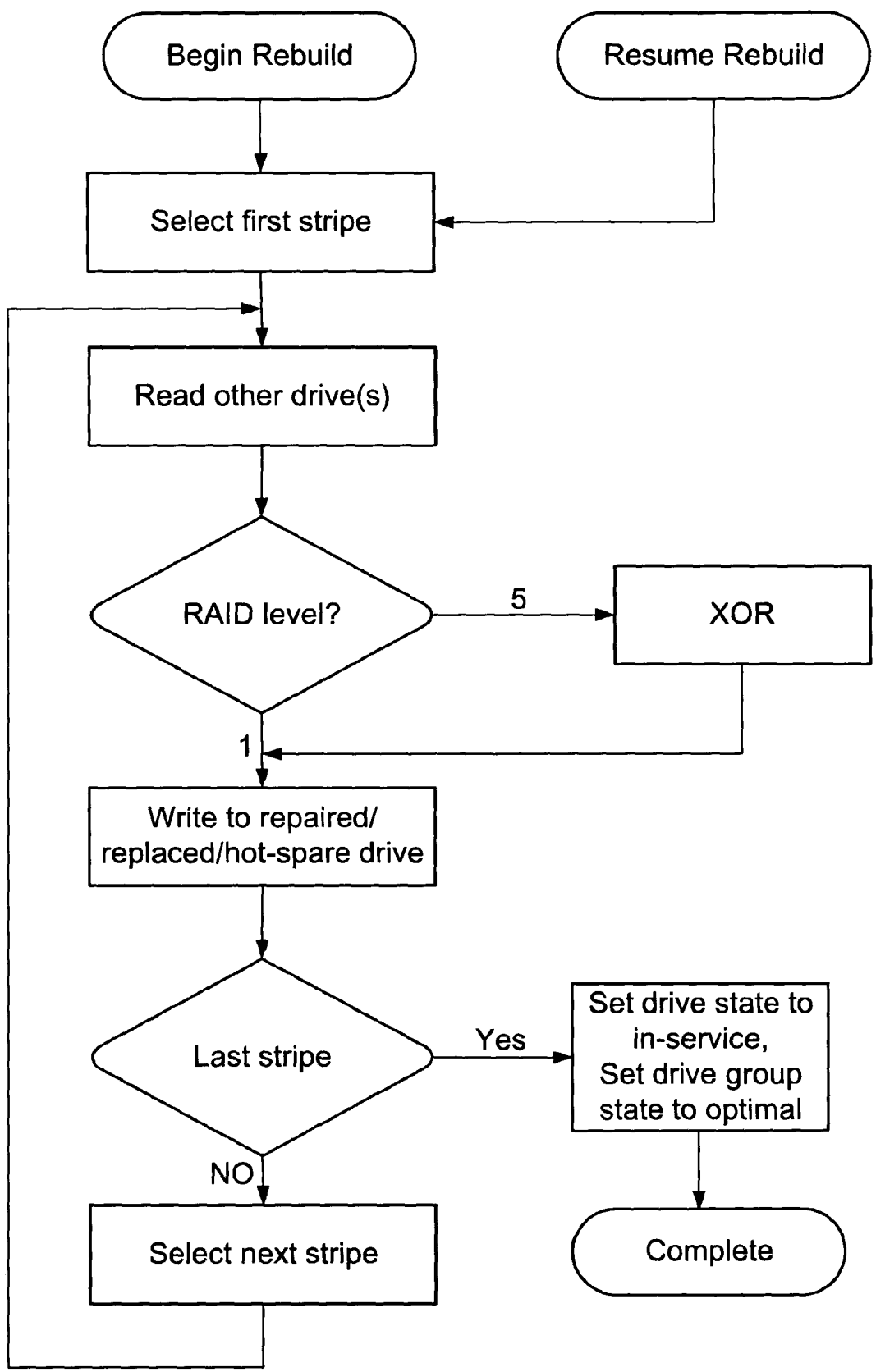
FIG. 6A is a flowchart of a serialized rebuild process without checkpoints.
Figure 6B:
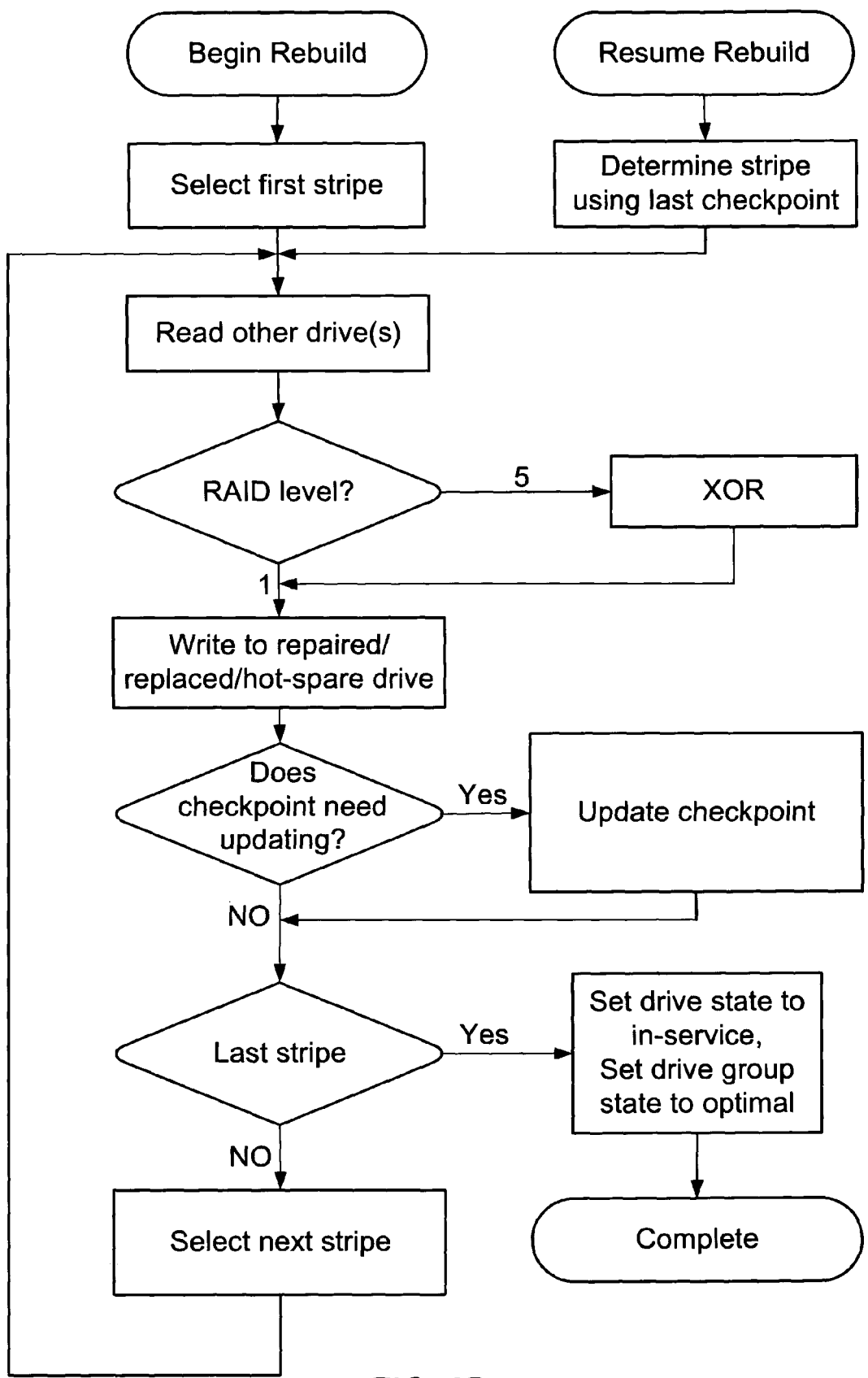
FIG. 6B is a flowchart of a serialized rebuild process with checkpoints.

FIGS. 6A and 6B show a serialized rebuild process without checkpoints and with checkpoints, respectively. A serialized rebuild process is a process in which the disk reads, XOR, and disk write do not overlap. In comparison, a parallel rebuild process (not shown) is one in which disk reads, XOR, and disk writes run concurrently.

Updating persistent checkpoints containing the progress of the rebuild operation is optional and may occur at any point in the rebuild process. When checkpoints are used (see FIG. 6B), an interrupted rebuild operation may be resumed at the last checkpoint. When checkpoints are not used (see FIG. 6A), an interrupted rebuild operation must start over at the first stripe. The frequency that checkpoints are updated determines the amount of data that need be rebuilt following an interruption and need be balanced with the overhead of updating a checkpoint.

Figure 7:
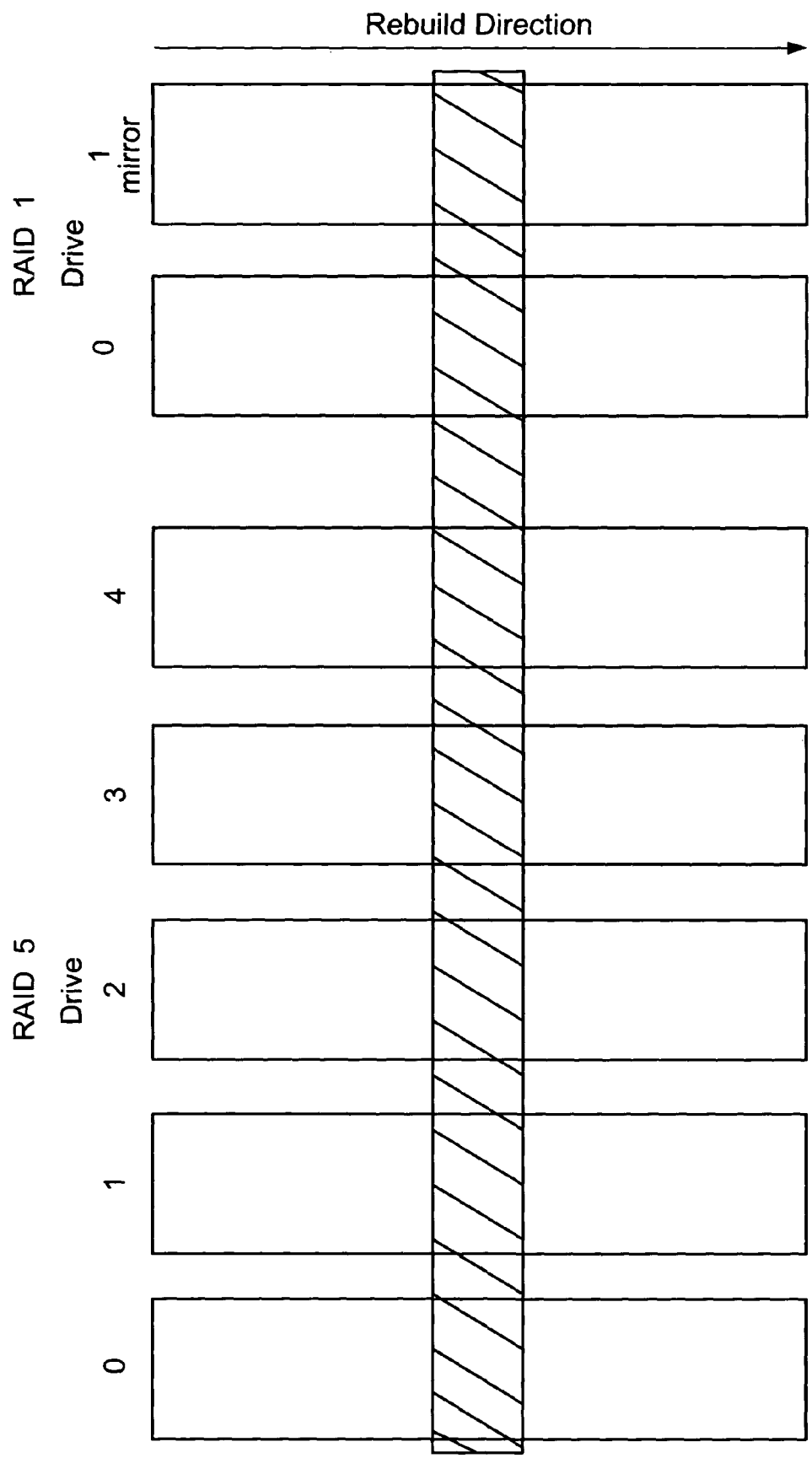
FIG. 7 is a schematic diagram illustrating rebuild progress.

At any point in time, all stripes up to the current stripe being rebuilt are in an optimal state and all stripes following the stripe being rebuilt are still in a degraded state. FIG. 7 illustrates these states, where the shaded area represents the current rebuild region, the stripes above the shaded area are optimal stripes, and the stripes below the shaded area are degraded stripes. It is understood that FIG. 7 is only an example and that the direction of the rebuild may be descending as well as ascending. It is even possible to use some other method that tracks each rebuilt block individually.

Figure 8:
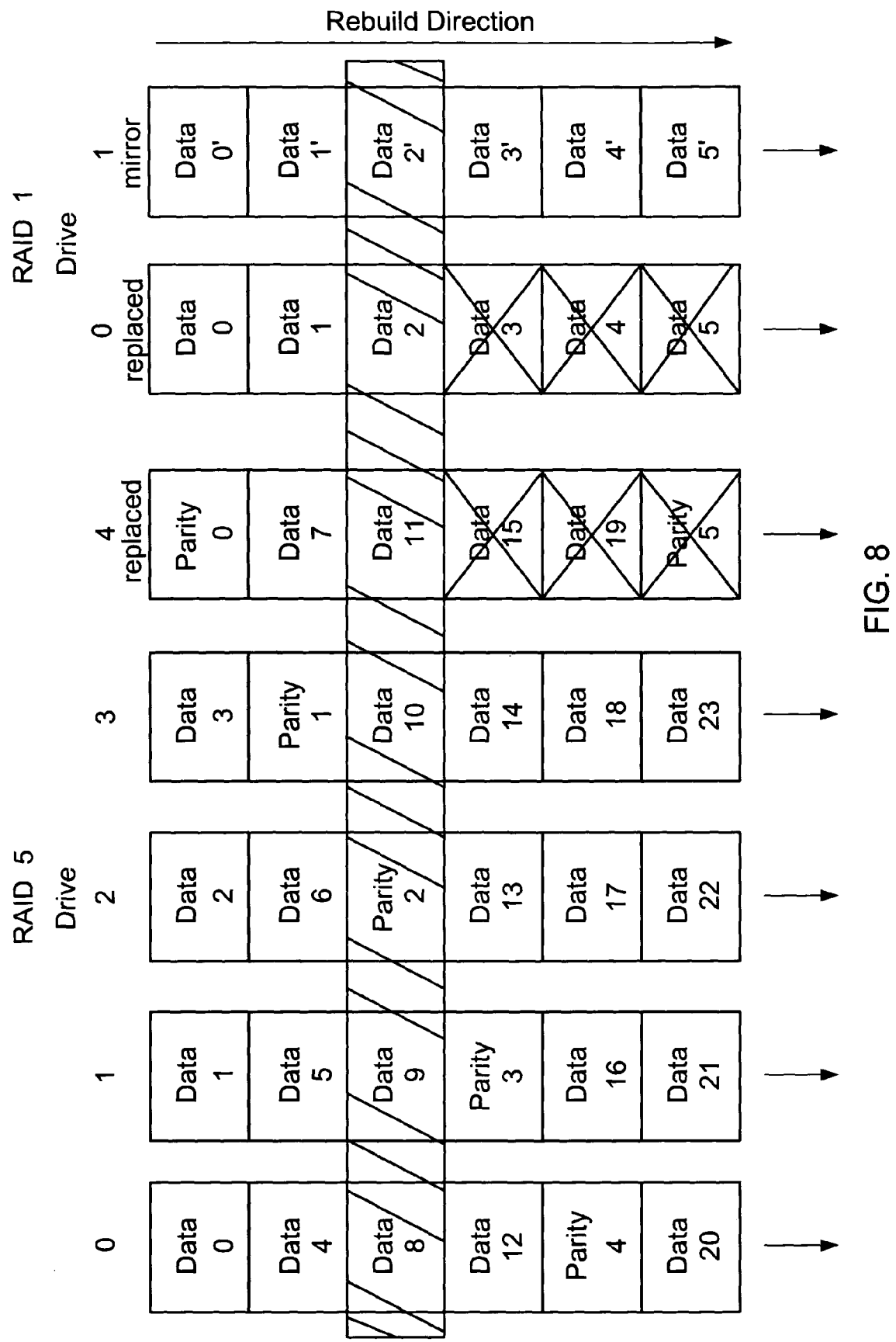
FIG. 8 is a schematic diagram illustrating data and redundancy block layout.

Read and write operations behave differently depending on whether or not the block has been rebuilt. In the present embodiment, determining whether a block has been rebuilt is simply a matter of knowing the relationship between the block to be read or written with respect to the current rebuild region and its direction of operation. FIG. 8 may be used as an example, where the shaded rectangle represents the current rebuild region. As shown, RAID 5, Drive 4 has been replaced, and RAID 1, Drive 0 has been replaced. Any read or write operation above the current rebuild region that requires a read of a data or parity block from the replaced drive is allowed since the data or parity block has already been rebuilt. Any read or write operation below the current rebuild region that requires a read of a data or parity block from the replaced drive is not allowed since the data or parity block has not been rebuilt yet. The methods used to perform the read and write operations are well known and are not discussed here.

Figure 9A:
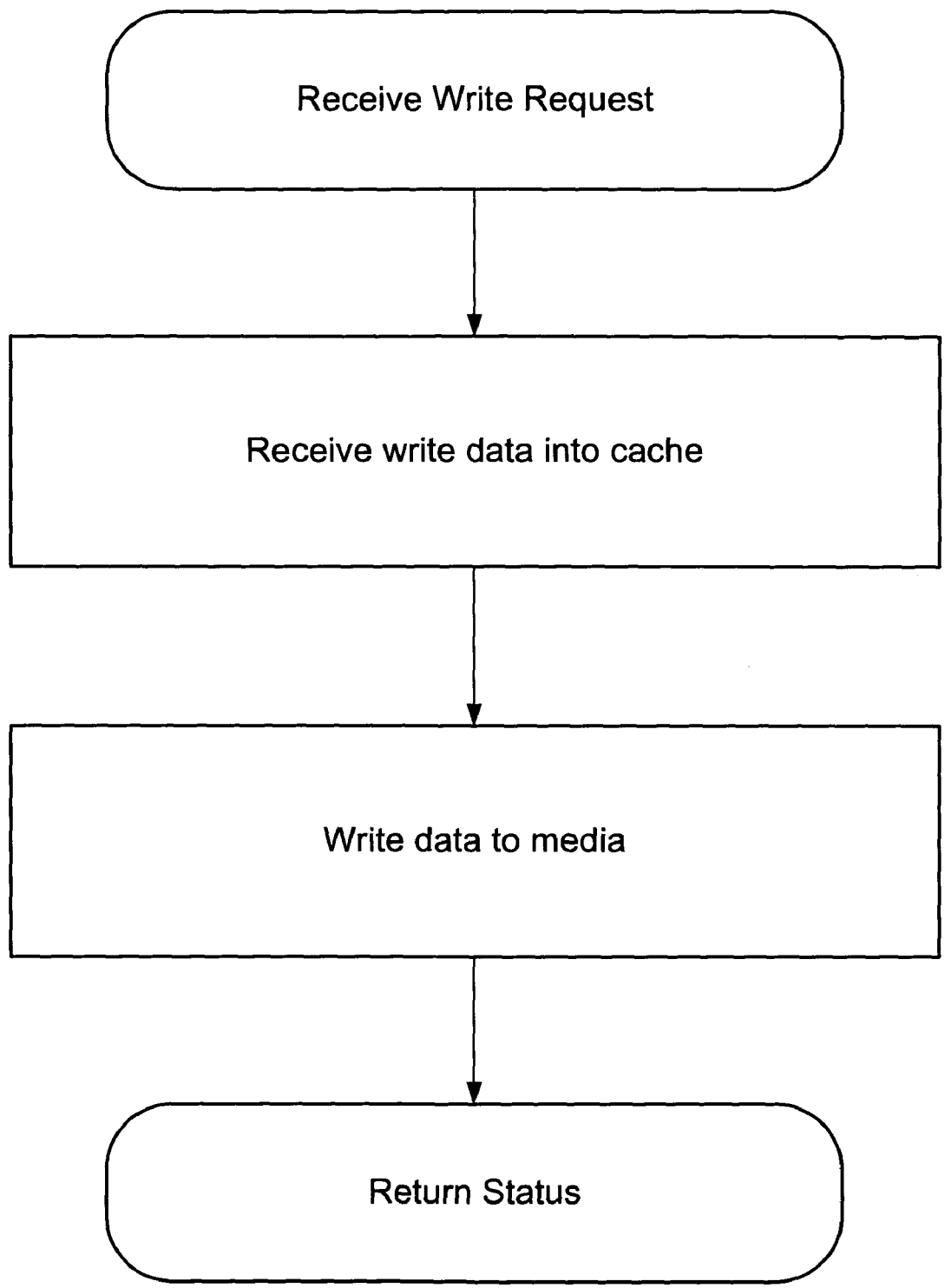
FIG. 9A is a flowchart of a method of write-through caching.
Figure 9B:
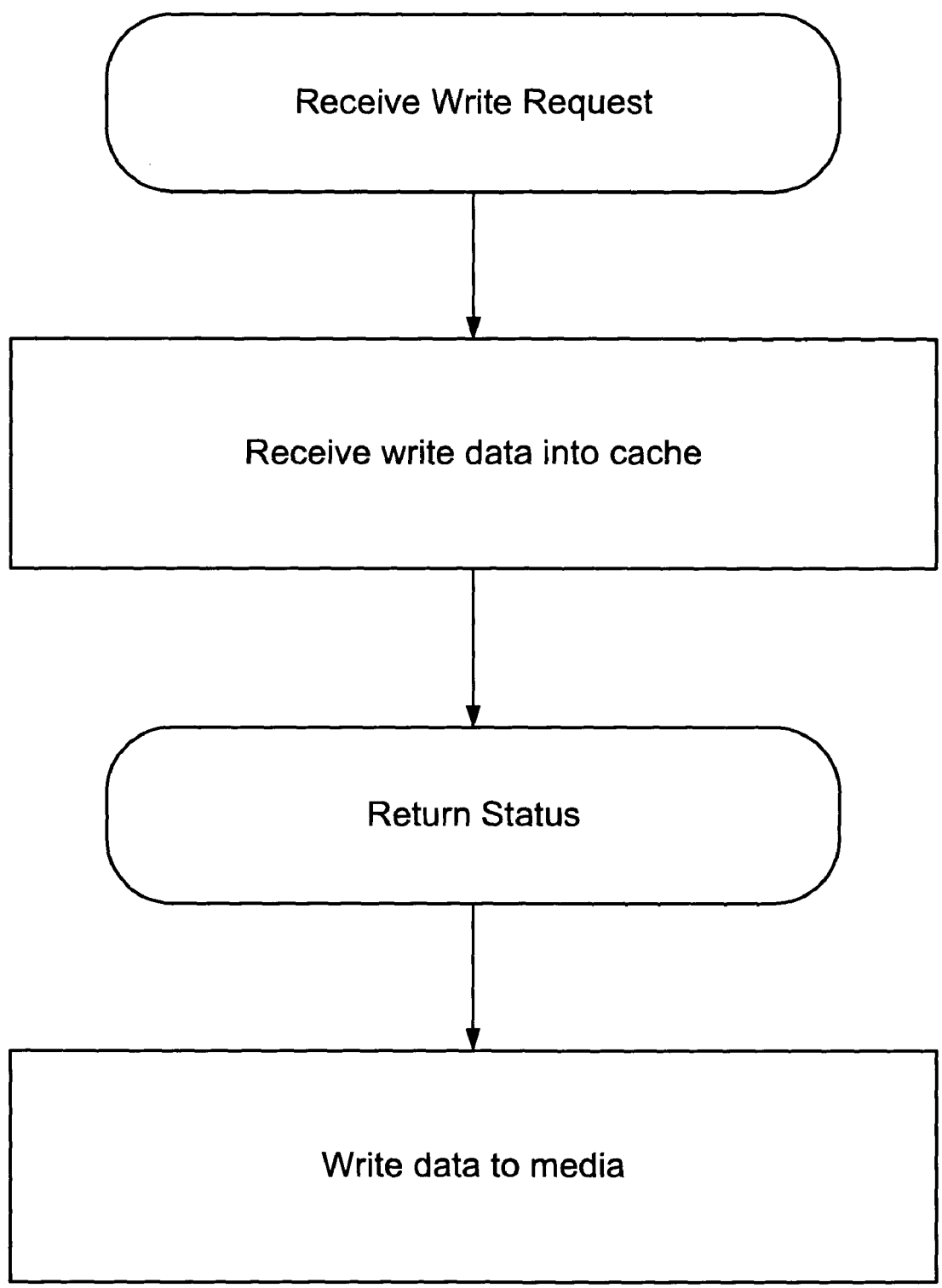
FIG. 9B is a flowchart of a method of write-back caching.

The present invention may also apply to RAID storage systems and disk drives that use large random access memories or cache buffers to improve performance. Two different methods of caching are typically used to handle write requests. One method is called write-through, and the other method is called write-back (FIG. 9B).

In the write-through method (FIG. 9A), a host sends a write request to the RAID storage system; the RAID storage system receives the data from the host into its cache, writes the data to disk, and returns a status back to the host. The process to write data to disk is similar. The RAID storage system sends a write request to the disk; the disk receives the data from the RAID storage system into its cache, the disk writes the data to media, and returns a status back to the RAID storage system. It is expected that once a successful status has been returned, either by the disk to the RAID storage system or by RAID storage system to the host, the data is persistent and may not be lost due to a power failure or reset. Conversely, if the RAID storage system is interrupted, due to a power failure or reset, before a status has been returned to the host, it is expected that the data is not persistent and the write request may be retried by the host. It is understood that a host may handle its own interruptions due to power failures or resets.

In the write-back method (FIG. 9B), a host sends a write request to the RAID storage system; the RAID storage system receives the data from the host into its cache, it returns a status to the host, and sometime later, it writes the data to disk. Since a status is returned to the host before data is committed to disk, then a power failure or reset of the RAID storage system may cause data loss unless the cache is non-volatile. In the present embodiment, the non-volatile cache, in the RAID storage system, is battery backed random access memory. The write-back method allows data from multiple host requests to remain in cache until it is convenient or necessary to write it to disk.

Write-back mode usually performs better than write-through mode up to the point that some component in the RAID storage system becomes a limiting factor. When this occurs, write-back performance drops to that of write-through performance.

One area of improved performance is the write response time. Response time is the elapsed time between when a host issues a write request to the RAID storage system until status has been returned. In both methods, this includes the time to transfer the data from the host to the controller's cache. However, write-through response time, unlike write-back response time, includes the time to perform any necessary RAID reads, generate RAID parity, and the time required to write the data to disk. With a shorter response time, the application running on the host can continue processing sooner, thereby allowing it to start the next IO sooner.

In write-back mode, the RAID storage system still incurs the overhead of RAID reads, RAID parity generation and the time required to write the data to disk. However, it may optimize those activities.

In write-back mode, cached data from multiple writes may be concatenated or grouped to make use of more efficient RAID write methods. With write-through, this capability is limited to the current number of queued write requests. Similarly, elevator-sorting methods used to reduce disk seek times work better for write-back cached data simply because there is a larger selection of data blocks to choose from.

Conventional disk drives (i.e. those with rotating media) are capable of both write-through and write-back methods. However, because of the cost, their cache is volatile instead of non-volatile. It is also cost prohibitive to protect all of the drives in an entire RAID storage system with an uninterruptible power supply (UPS). As a result, write-back caching on the drive is not used because of the potential for data loss in the event of a power failure or reset.

Some RAID storage system vendors allow a system administrator to enable write-back caching on the drives to improve performance with the understanding that data loss may occur if a drive is reset, or loses power. With this understanding, the system administrator uses the drives for non-critical and/or temporary data storage (typically any data that does not require a significant amount of time to recreate).

The present invention may reduce the time of a disk rebuild process on a RAID device by enabling write-back caching on the drive being rebuilt, independent of whether or not write-back caching is enabled in the RAID storage system. Write-back caching on the drive is typically not used because the drive's cache is volatile and data loss may occur if the drive is reset or loses power before the cache can be flushed to media. The present invention solves this problem by providing recovery in the event that unwritten data in the drive's cache is lost due to a power failure or reset.

Typically, reduced rebuild times may be accomplished by using larger IO sizes or by managing multiple concurrent rebuild IOs. However, either of these solutions reduces the amount of memory available for other IO processing, and managing multiple concurrent rebuild IOs tends to be more complex than a serialized rebuild process. Using these methods in addition to the present write-back caching on the drive may improve performance even more.

When using write-back caching to a drive being rebuilt, two different methods may be used to recover data that was lost from the drive's cache after a power failure or reset. If the drive has the capability to write-through to media on an individual write request basis independent of the caching mode, then a method that employs checkpoints may be used; otherwise, a method that does not employ checkpoints must be used. In either case, the lost data is rebuilt from the last written checkpoint or rebuilt entirely starting with the first block on the drive.

Figure 10A:
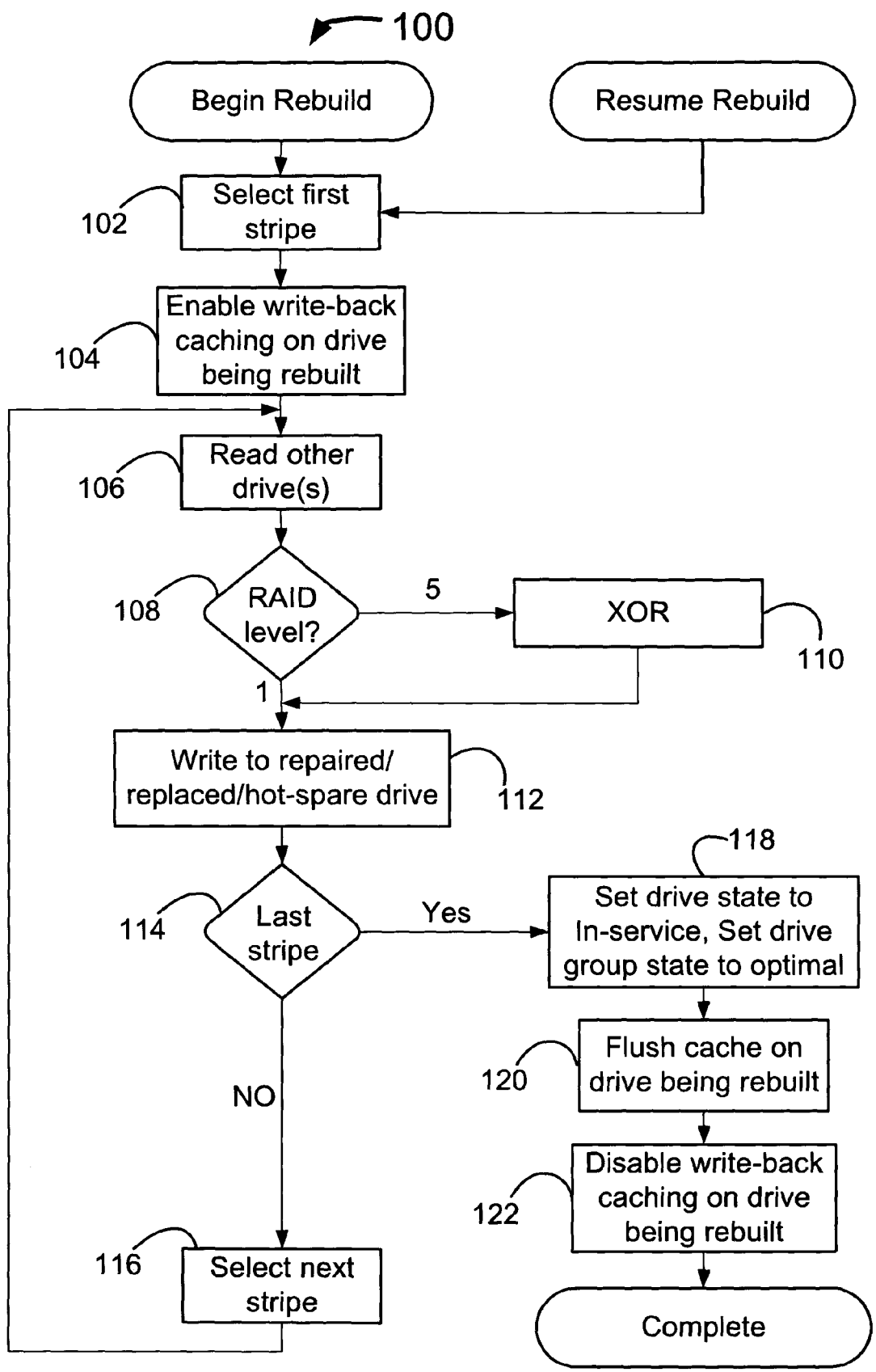
FIG. 10A is a flowchart of a serialized rebuild process without checkpoints in accordance with an exemplary embodiment of the present invention.

FIG. 10A is a flowchart of a serialized rebuild process or method 100 without checkpoints in accordance with an exemplary embodiment of the present invention, where the disk drive does not support a forced media access. The method 100 may reduce rebuild time on a RAID device. A first stripe of the RAID device is selected 102. Write-back caching on a drive being built is enabled 104. Data and/or parity may be read from at least one other drive 106. The at least one other drive and the drive being built belong to a same stripe of the RAID device. A RAID level of the RAID device is checked 108. When the RAID level is 5, the at least one of data or parity is XORed to obtain a result 110. When the RAID level is 1, the at least one of data or parity is data and treated as the result. The result is written to a second drive, which is a repaired, replaced, or hot-spare drive for the drive being built 112. It is checked whether the last stripe has been reached 114. If the last stripe has not been reached, a next stripe is selected 116, and the method 100 returns to the step 106. If the last stripe has been reached, a drive state of the RAID device is set to in-service, and a drive group state is set to optimal 118. Cache on the drive being built is flushed 120. The write-back caching on the drive being built is disabled 122.

Figure 10B:
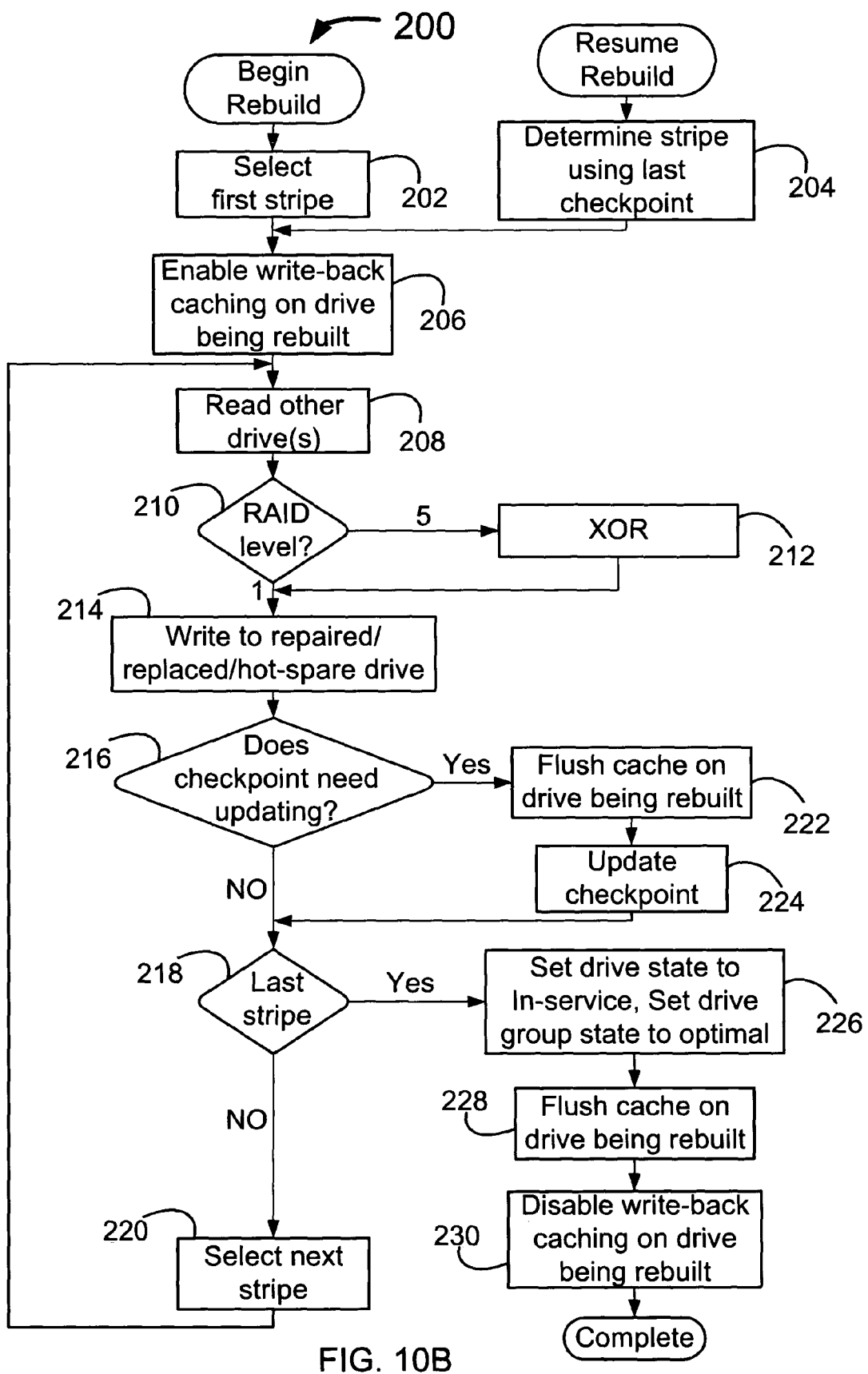
FIG. 10B is a flowchart of a serialized rebuild process with checkpoints in accordance with an exemplary embodiment of the present invention.

FIG. 10B is a flowchart of a serialized rebuild process or method 200 with checkpoints in accordance with an exemplary embodiment of the present invention. The method 200 may reduce rebuild time on a RAID device. A first stripe of the RAID device is selected 202 to start the rebuild process 200, or a stripe of the RAID device is determined using a last checkpoint 204 to resume the rebuild process 200. Write-back caching on a drive being built is enabled 206. Data and/or parity may be read from at least one other drive 208. The at least one other drive and the drive being built belong to a same stripe of the RAID device. A RAID level of the RAID device is checked 210. When the RAID level is 5, the at least one of data or parity is XORed to obtain a result 212. When the RAID level is 1, the at least one of data or parity is data and treated as the result. The result is written to a second drive, which is a repaired, replaced, or hot-spare drive for the drive being built 214. It is inquired whether the checkpoint needs updating 216. If the checkpoint does not need updating, it is checked whether the last stripe has been reached 218. If the last stripe has not been reached, a next stripe is selected 220, and the method 200 returns to the step 208. If the last stripe has been reached, a drive state of the RAID device is set to in-service, and a drive group state is set to optimal 226. Cache on the drive being built is flushed 228. The write-back caching on the drive being built is disabled 230.

After the step 216, if the checkpoint needs updating, cache on the drive being built is flushed 222. The checkpoint is updated 224, and the method 200 proceeds to the step 218.

During a rebuild operation where checkpoints are used, non-rebuild write operations to the drive being rebuilt may request forced-unit-access writes. The drive may not return a status back to the RAID storage system for a forced-unit-access write until write data has been committed to media.

The RAID storage system has several well know mechanisms that protect user data, redundancy data (parity and mirror data), and RAID storage system meta-data from RAID storage system interruptions caused by resets and power cycles. Since these mechanisms were designed for use with a drive in write-through mode, using forced-unit-access write requests to a drive while it is in write-back mode may allow those methods to continue to work properly without change and also may allow the rebuild operation to resume from the last recorded checkpoint.

In the event that a drive is reset or power-cycled, the RAID storage system may automatically retry any write that has not had status returned. This may include any currently unfinished forced-unit-access write and rebuild write, but it does not include rebuild writes that have completed since the last checkpoint. In this case, the rebuild process may restart from the last recorded checkpoint.

Figure 11:
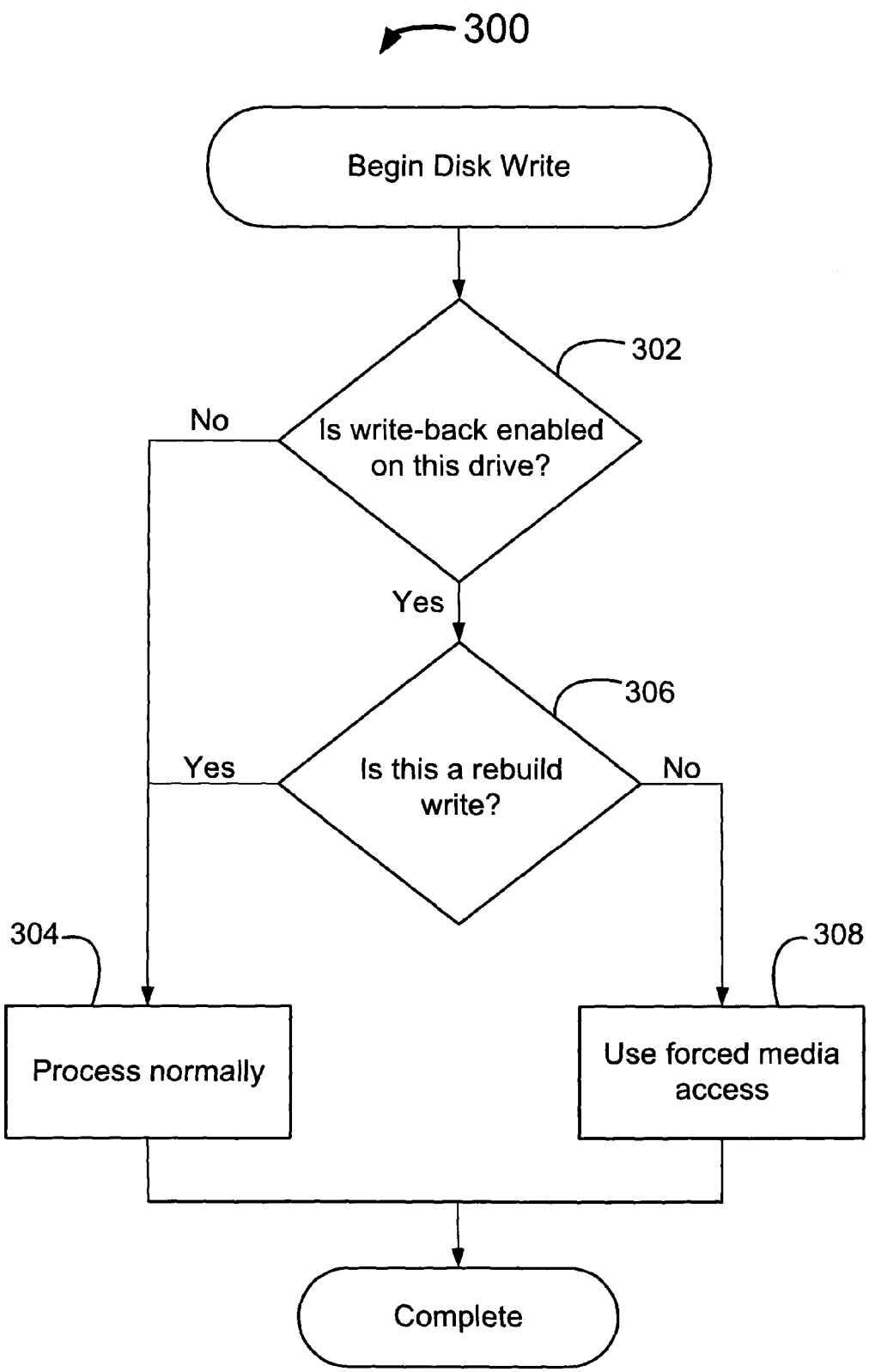
FIG. 11 is a flowchart of a method of a disk write process in accordance with an exemplary embodiment of the present invention.

FIG. 11 is a flowchart of a method 300 of a disk write process in accordance with an exemplary embodiment of the present invention. The method 300 may be implemented during a disk rebuild operation of a RAID device where checkpoints are used. It is checked whether write-back is enabled on a drive 302. If the write-back is not enabled on the drive, the drive is written normally, i.e., without using a forced media access 304. If the write-back is enabled on the drive, it is inquired whether a write to be written to the drive is a rebuild write 306. If the answer is yes, the method 300 proceeds to the step 304; if the answer is no, then the drive is written using a forced media access 308.

It is understood that the present invention is not limited to the serialized rebuild process and may be used with other rebuild processes without departing from the scope and spirit of the present invention.

The present invention may have the following advantages. It makes use of a disk drive's write-back caching capability to improve rebuild performance without the need to make the drive's cache non-volatile. Moreover, the present method provides for full recovery from the loss of the contents of the drive's cache in the event of a drive reset or power failure. Further, the present invention does not depend on the RAID storage system's caching capabilities to recover from a data loss.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for reducing rebuild time on a Redundant Array of Independent Disks (RAID) device, comprising steps of:
   beginning or resuming a rebuild process with at least one of selecting a first stripe of said RAID device or determining a stripe of said RAID device using a last checkpoint;
   enabling write-back caching on a drive being built;
   reading at least one of data or parity from at least one other drive, said at least one other drive and said drive being built belonging to a same stripe of said RAID device;
   exclusive ORing (XORing), when a RAID level of said RAID device is 5, said at least one of data or parity to obtain a result;
   treating, when said RAID level of said RAID device is 1, said at least one of data or parity as said result;
   writing said result to a second drive, said second drive being a repaired, replaced, or hot-spare drive for said drive being built;
   checking whether a checkpoint needs updating; and
   during said rebuild process, providing a non-rebuild write operation to the drive being built, the non-rebuild write operation requesting a forced-unit-access write, wherein the drive being built returns a status responsive to the forced-unit-access write only after all write data of the forced-unit-access write has been written to and committed to media of the drive being rebuilt.

2. The method of claim 1, further comprising a step of inquiring, when said checkpoint needs no updating, whether a last stripe of said RAID device is reached.

3. The method of claim 2, further comprising steps of:
   selecting, when said last stripe of said RAID device is not reached, a next stripe; and
   repeating said steps of reading, XORing, treating, writing, checking and inquiring until said last stripe is reached.

4. The method of claim 3, further comprising a step of setting, when said last stripe is reached, a drive state of said RAID device to in-service and a drive group state to optimal.

5. The method of claim 4, further comprising a step of flushing cache on said drive being built.

6. The method of claim 5, further comprising a step of disabling said write-back caching on said drive being built.

7. The method of claim 1, further comprising a step of flushing, when said checkpoint needs updating, cache on said drive being built.

8. The method of claim 1, further comprising a step of updating said checkpoint.

9. The method of claim 1, further comprising a step of inquiring whether a last stripe of said RAID device is reached.

* * * * *